United States Patent
Böhme et al.

(10) Patent No.: US 10,006,437 B2
(45) Date of Patent: Jun. 26, 2018

(54) METHOD FOR OPERATING A WIND POWER PLANT

(71) Applicant: Senvion SE, Hamburg (DE)

(72) Inventors: Sebastian Böhme, Büdelsdorf (DE); Bert Gollnick, Fürstenwalde (DE)

(73) Assignee: Senvion SE, Hamburg (DE)

( * ) Notice: Subject to any disclaimer, the term of this patent is extended or adjusted under 35 U.S.C. 154(b) by 1026 days.

(21) Appl. No.: 14/202,052

(22) Filed: Mar. 10, 2014

(65) Prior Publication Data

US 2014/0186177 A1 Jul. 3, 2014

Related U.S. Application Data

(63) Continuation of application No. PCT/EP2012/003791, filed on Sep. 10, 2012.

(30) Foreign Application Priority Data

Sep. 22, 2011 (DE) .................. 10 2011 083 178

(51) Int. Cl.
*F03D 7/02* (2006.01)
*G01W 1/02* (2006.01)
*F03D 7/04* (2006.01)

(52) U.S. Cl.
CPC ........... *F03D 7/0224* (2013.01); *F03D 7/028* (2013.01); *F03D 7/04* (2013.01); *F03D 7/043* (2013.01);
(Continued)

(58) Field of Classification Search
CPC ........ F03D 7/0224; F03D 7/0276; F03D 7/04; F03D 7/043; F03D 7/028; F05B 2270/103;
(Continued)

(56) References Cited

U.S. PATENT DOCUMENTS 4,556,801 A * 12/1985 Gervasio ................. F03D 9/002
290/44
6,784,564 B1 * 8/2004 Wobben ................ F03D 7/0284
290/44

(Continued)

FOREIGN PATENT DOCUMENTS

CA 2845633 A1 3/2013
DE 102009037239 2/2011

(Continued)

OTHER PUBLICATIONS

Hau, Erich; Windkraftanlagen, Grundlagen, Technik, Einsatz, Wirtschaftlichkeit, 4th Edition, Springer-Verlag 2008.

(Continued)

*Primary Examiner* — Christopher Verdier
*Assistant Examiner* — Wayne A Lambert
(74) *Attorney, Agent, or Firm* — Rankin, Hill & Clark LLP (57) ABSTRACT

A method for operating a wind power plant having at least one rotor blade, the blade angle of which can be adjusted. The wind power plant is operated with a predefinable reduced energy output set point. To determine the potential output, at least one predefinable operating parameter of the wind power plant is measured and is applied to at least one stored characteristic curve for the reduced energy output set point. The actual energy output is determined and the loss in the output is formed from the difference between the potential output and the actual energy output.

10 Claims, 4 Drawing Sheets

(52) U.S. Cl.
CPC ........... *G01W 1/02* (2013.01); *F05B 2270/32* (2013.01); *F05B 2270/335* (2013.01); *Y02E 10/723* (2013.01)

(58) Field of Classification Search
CPC .......... F05B 2270/1033; F05B 2270/32; F05B 2270/335; F05B 2270/337; F05B 2270/327; F05B 2270/328; Y02E 10/723; G01W 1/02
USPC .......................................................... 415/1
See application file for complete search history.

(56) References Cited

U.S. PATENT DOCUMENTS

| | | | | |
|---|---|---|---|---|
| 7,528,496 | B2* | 5/2009 | Fortmann | F03D 7/0264 290/44 |
| 7,629,702 | B2* | 12/2009 | Schubert | F03D 7/0224 290/44 |
| 7,800,242 | B2* | 9/2010 | Stiesdal | F03D 7/0272 290/40 B |
| 7,898,099 | B2* | 3/2011 | Stiesdal | F03D 7/0284 290/40 B |
| 8,148,835 | B2* | 4/2012 | Jurkat | F03D 7/047 290/44 |
| 8,604,633 | B2* | 12/2013 | Llombart Estopinan | F03D 7/028 290/44 |
| 8,903,555 | B2* | 12/2014 | Nakashima | F03D 7/0284 290/44 |
| 2012/0292903 | A1* | 11/2012 | Merkel | F03D 7/0272 290/44 |

FOREIGN PATENT DOCUMENTS

| | | |
|---|---|---|
| EP | 2020506 | 2/2009 |
| WO | 01/25630 | 4/2001 |

OTHER PUBLICATIONS

Hu, Erich, "Wind Turbines: Fundamentals, Technologies, Application, Economics", 2006, pp. 485-494, 2nd Edition, Springer Verlag, Berlin, Germany.

* cited by examiner

METHOD FOR OPERATING A WIND POWER PLANT

BACKGROUND OF THE INVENTION

Field of the Invention

The invention relates to a method for operating a wind power plant having at least one rotor blade, the blade angle of which can be adjusted, wherein the wind power plant is operated with a predefinable reduced energy output set point.

Description of Related Art

With the operation of wind power plants it can occur that the wind power plants must be reduced in the power thereof due to external demands, for example from the network supplier, or due to disturbances. With a reduction of power of the wind power plant that is not caused by the operator of the wind power plant but rather by the network supplier for example, it is necessary to quantify the lost energy output because as a rule someone has to provide compensation payments for this output that was not realized.

If there is a wind measurement mast in the proximity of the wind power plant or the wind farm, the potential output of the wind power plant, when the wind power plant is operated with a reduced energy output set point, can be calculated using an existing power curve of the wind power plant in the performance-optimized normal mode of the wind power plant, by measuring an actual wind speed and transferring this into the power curve, or respectively the energy output curve of the wind power plant. For this purpose then, the actual energy output which is attained by the desired, or respectively predetermined reduction, must be measured. With the knowledge of the actual wind strength, the potential output is then determined using the power curve, or respectively energy output curve, of the wind power plant in the performance-optimized normal mode, and correspondingly the difference of these two energy outputs is formed, namely of the potential output of the wind power plant, which corresponds to the energy output that would be attained by the wind power plant in the performance-optimized normal mode with the present wind speed, and the actual measured reduced energy output due to the predetermined reduced energy output set point. This difference corresponds to the loss in the output and must be remunerated then by the network operator, for example, to the operator of the wind power plant.

Typically, however, there is no wind measurement mast in the proximity of a wind power plant, or respectively a wind farm, or respectively a wind measurement mast would indicate only approximate information about the actual wind speed at a wind power plant when for example, the wind power plant does not have freely inflowing wind or the wind measurement mast would not have appropriate freely inflowing wind, or respectively turbulent wind is present.

In addition, the idea to use a nacelle anemometer of the reduced power plant, or respectively the wind power plant, which is operated with a predefinable reduced energy output set point, is not suitable because the anemometer measurement is heavily distorted due to the rotor. For the performance-optimized normal mode of the wind power plant, static anemometer corrections are used for this purpose which, however, are not applicable to the anemometer measurement values when the wind power plant is operated at a predefined reduced energy output set point, thus outside of the performance-optimized normal mode.

BRIEF SUMMARY OF THE INVENTION

The object of the present invention is to eliminate this disadvantage of the prior art, and to specify a method for operating a wind power plant, having at least one rotor blade, the blade angle of which is adjustable, wherein the wind power plant is operated with a predefinable reduced energy output set point, so that a loss in output of the wind power plant, or respectively a wind farm, can be determined more precisely.

This object is solved by a method for operating a wind power plant having at least one rotor blade, the blade angle of which can be adjusted, which is operated with a predefinable reduced energy output set point, wherein for determining a loss in output, a potential output is determined, wherein to determine the potential output at least one predefinable operating parameter of the wind power plant is measured and is applied to at least one stored characteristic curve for the reduced energy output set point, wherein, in addition, the actual energy output is determined and the loss in the output is formed from the difference between the potential output and the actual energy output.

With the method according to the invention, the term "predefinable reduced energy output set point" also includes a predefinable reduced power for a period of time. A "potential output" in the scope of the invention is in particular a possible energy output of the wind power plant as long as this plant is operated in a power-optimized normal mode, as this is represented for example in image 14.2 in the textbook Wind Power Plants Fundamentals, Technology, Application, Economics ["Windkraftanlagen Grundlagen, Technik, Einsatz, Wirtschaftlichkei"] by Erich Hau, 4th Edition, Springer Verlag, 2008, page 542 for 22 RPM for example. The potential output is then the corresponding power output over a specific period of time. A rotor blade with adjustable blade angle in the scope of the invention includes a rotor blade which can be rotated, in particular about the longitudinal axis thereof.

The stored characteristic curve provided according to the invention is a characteristic curve relating to at least one operating parameter of the wind power plant in an operation outside of a performance-optimized normal mode, thus with which the wind power plant is operated with a reduced energy output set point. Additionally, a characteristic curve which applies for the power-optimized normal mode is stored. Here, in particular this means an anemometer corrected characteristic curve for the performance-optimized normal mode.

Preferably, a power-dependent parameter, a rotation-dependent parameter, a blade angle-dependent parameter and/or a wind speed-dependent parameter is, or are, provided as predefinable operating parameter(s).

In a first particularly preferred embodiment, a wind speed measured by means of a nacelle anemometer of the wind power plant is provided as a wind speed-dependent parameter which is transformed with a stored characteristic curve for the predefined reduced energy output set point into a actual wind speed and/or a potential output. With this concept, preferably a plurality of anemometer corrected characteristic curves for different degrees of power reduction, or respectively predefined reduced energy output set points, are used. The operating parameter which is measured is the wind speed measured using the nacelle anemometer. This is determined using a characteristic curve, which was determined in advance in a reference measurement, and which is provided as a type of correction function for the nacelle anemometer signal depending on the degree of the power reduction, or respectively reduction of the energy output set point. Such measurement value corrections of the anemometer measurement values are necessary because the rotor distorts the nacelle anemometer measurement depending on the energy which it extracts from the wind. The characteristic curve for a predefinable reduced energy output set point could be, for example, the limitation of the energy output, or respectively the power, up to 90% or 75% or 50% or 25% of the nominal power, or respectively the potential energy. Thus it is expedient to provide a group of characteristic curves in order to have, with reduction of the energy output set point, an appropriately fitting characteristic curve measured in advanced.

In a particularly advantageous embodiment a characteristic curve group of at least three characteristic curves is used, with which one characteristic curve is valid for the performance-optimized normal mode, wherein in addition, a second characteristic curve is valid for the powerless operation or operation nearly without power, for example with less than 10% of the actual potential output. At least one further characteristic curve then lies between the first and the second characteristic curves in operation with predefined reduced energy output set point.

Such characteristic curves for the correction of the nacelle anemometer measurement signal can be measured in a reference measurement. This can be performed on a prototype of the wind power plant or another reference plant, or alternatively even on the wind power plant itself, for example by providing a calibrated anemometer signal, for example, using, in particular, a temporarily erected measurement mast or a neighboring reference wind power plant which was already measured.

Preferably the potential output is determined by means of a characteristic curve for the predefined reduced energy output set point and a measured rotation-dependent parameter and a measured blade angle-dependent parameter.

Using this particularly preferred embodiment of the method according to the invention, the potential output of the wind power plant with predefinable, or respectively predefined, reduced energy output set point is gathered from rotor data. Here, in particular, characteristic curve fields are used which are provided for the rotor at an appropriately reduced energy output set point. The actual wind speed, or respectively the potential output, is then gathered from, in particular, a measured, rotation-dependent parameter, such as the rotational speed, and in particular, a measured, blade angle-dependent parameter, such as the blade angle.

With the use of the rotor data for determining the potential output, the characteristic curves are preferably determined from reference measurements. However it is also preferably possible to determine the characteristic curves using simulation calculations.

Preferably, a power-dependent and a rotation-dependent and a blade angle-dependent parameter are determined, wherein at least one of the three named parameters is measured. Hereby it is possible to determine the potential output very precisely.

If the power specification, or respectively the reduced energy output set point, is 0% of the nominal power, a particularly simple preferred method can be attained in that a constant blade angle is set or a constant rotor rotational speed is regulated such that then with a constant blade angle setting an actual wind speed and thus a potential output can be determined from the rotor rotational speed, and conversely, with a predefined rotor rotational speed to be regulated, using the blade angle adjusted for this, an actual wind speed, or respectively the potential output, can be determined. A detailed explanation is given in the following in particular with reference to the figures.

Preferably, the at least one stored characteristic curve is or will be determined at the wind power plant or a wind power plant corresponding to this wind energy, by means of at least one reference measurement and a calibrated energy output signal and/or wind speed signal. As already specified, the calibrated wind speed signal can be determined, for example from a measurement mast in the proximity of the wind power plant, or respectively if the wind power plant is not yet erected, at the site of the wind power plant. The calibrated wind speed signal can also be determined from a neighboring, already calibrated wind power plant with freely inflowing wind.

Preferably a group of characteristic curves is provided for different predefined reduced energy output set points. Thereby, the method for different reduced energy output set points is very precise. With a predefined reduced energy output set point that is not measured, preferably there is interpolation between the characteristic curves. Here the interpolation can be linear, quadratic or be attained by, for example, using splines with functions which also include the third power.

Preferably, a power or a torque is provided as a power-dependent parameter, a rotational speed or a centrifugal force is provided as a rotation-dependent parameter and/or a blade angle or a pressure difference on a rotor blade is provided as a blade angle-dependent parameter. Other measurement variables can also be defined as appropriate parameters, which can be changed by appropriate conversion to the desired parameters, that are equal to the power-dependent parameter, to the rotation-dependent parameter or to the blade angle-dependent parameter.

A method for operating a wind farm with a plurality of wind power plants is preferred that is designed such that at least one wind power plant of the preceding type is operated according to a method as described above.

The method for operating a wind farm is particularly preferred and simple when the at least one wind power plant is operated powerless, or respectively with a predefined reduced energy output set point of 0% and the further wind power plants of the wind farm are operated in a performance-optimized normal mode. A powerless operation of a wind power plant, or respectively an operation of a wind power plant with a predefined reduced energy output set point of 0%, in the scope of the invention is an operation during which the rotor of the wind power plant rotates about the horizontal axis thereof without supplying energy into a network.

If the wind farm has, for example, 10 wind power plants and a 10% reduction of the nominal power, or respectively the nominal potential output is to be provided, one of the wind power plants of the wind farm can be operated powerless and the remainder can be operated in a performance-optimized normal mode such that a nominal power of the wind farm is specified by 90% of the potential yield, or respectively of the overall nominal power. The wind power plant operated powerless, or respectively with a reduced energy output set point of 0%, can also be used simply for the purpose of determining the actual wind speed. Additional designs are dealt with in the following for this purpose.

This preferred method is particularly precise then when the wind farm has a plurality of wind power plants, for example more than 20 wind power plants. In this case, a very precise setting of the farm power, or respectively the farm output, is possible, wherein using the wind power plant, or respectively wind power plants, which are operated with a reduced energy output set point of 0%, the output potential of these wind power plants can also be determined very precisely and easily.

Preferably the wind power plant operated powerless is set to a predefined blade angle of the at least one rotor blade, and the potential output is determined from the measured, or respectively determined rotational speed, using a characteristic curve. As an alternative to this, the wind power plant operated powerless is preferably set, or respectively regulated, to a predefined rotational speed, and the potential output is determined using a characteristic curve based on the measured, or respectively specified, blade angle of the rotor blades, or the rotor blade, of the wind power plant.

In a further advantageous embodiment, substantially all plants in a wind farm are operated with an equally reduced energy output set point. This has the advantage that the power of the wind farm can be adjusted infinitely variably, for example when there are particularly precise demands on the accuracy of the requested reduction of the energy output set point. In addition, this method has the advantage that all wind power plants of the wind farm age uniformly. In the case of the uniform reduction of the energy output set point with all wind power plants, the determination of the loss in the output is, however, not as easily possible as in the case of the powerless operation.

Preferably a wind speed-dependent parameter is measured for each wind power plant and applied to a plurality of stored characteristic curves, or a power-dependent and a rotation-dependent and a blade angle-dependent parameter is determined or measured, wherein at least one of the last three named parameters is measured. The last named embodiment is based on the realization that the knowledge of these three parameters is expedient for the most exact determination of the potential output of the wind rotor. Due to the control technology in practice in the wind power plants, it can however be sufficient to measure only one or two of these three parameters. This applies in particular for wind power plants for which the controller sets a fixed characteristic curve, for instance the torque in fixed dependency on the blade angle, or the rotor blade angle depending on the generator power. In this case a portion of the parameters can be determined without measurement, and only the measurement of the free, unknown parameters is necessary in order to determine all three parameters for determining the potential output.

Thus, the object is solved in particular by a method for determining the output loss of a wind power plant with power reduced to a predefined degree, with at least one rotor blade having blade angle adjustment, by determining operating parameter characteristic curves, or respectively characteristic curves, depending on the degree of the power reduction in at least one reference measurement by means of a calibrated energy output, or respectively wind speed signal, wherein the characteristic curve, or respectively the characteristic curves are transferred, or respectively stored, in a data store assigned to the wind power plant, wherein a potential output of the wind power plant is performed by measuring operating parameters at the wind power plant and applying the stored characteristic curve, or respectively characteristic curves, depending on the degree of the power reduction, wherein the available energy output is determined by measuring operating parameters at the wind power plant, for example the delivered power, and the energy loss of the wind power plant is determined from the difference of the potential output and the present energy input or respectively energy output.

The potential output can occur for example also by determining an estimated wind speed which can then be converted into the potential output by means of a power curve, or respectively output curve, of the wind power plant.

A calibrated wind speed signal preferably originates from a measurement mast having a calibrated wind sensor, however can also be provided by a calibrated energy output signal or wind speed signal of a neighboring wind power plant, which encounters freely inflowing wind. The power is according to the invention preferably the output power. Here, it can however also be the mechanical power at the rotor, for example one which is determined by measuring torque at a rotor shaft. Correspondingly, energy output is also discussed when a specific power is named, wherein the energy output represents the corresponding power over a certain period of time, and in particular according to the known formula: energy=power×time.

Further characteristics of the invention will become apparent from the description of the embodiments according to the invention together with the claims and the included drawings. Embodiments according to the invention can fulfill individual characteristics or a combination of several characteristics.

BRIEF DESCRIPTION OF THE DRAWINGS

The invention is described below, without restricting the general intent of the invention, based on exemplary embodiments in reference to the drawings, whereby we expressly refer to the drawings with regard to the disclosure of all details according to the invention that are not explained in greater detail in the text. The figures show.

In the drawings, the same or similar types of elements and/or parts are provided with the same reference numbers so that a corresponding reintroduction can be omitted.

DETAILED DESCRIPTION OF THE INVENTION

Figure 1:
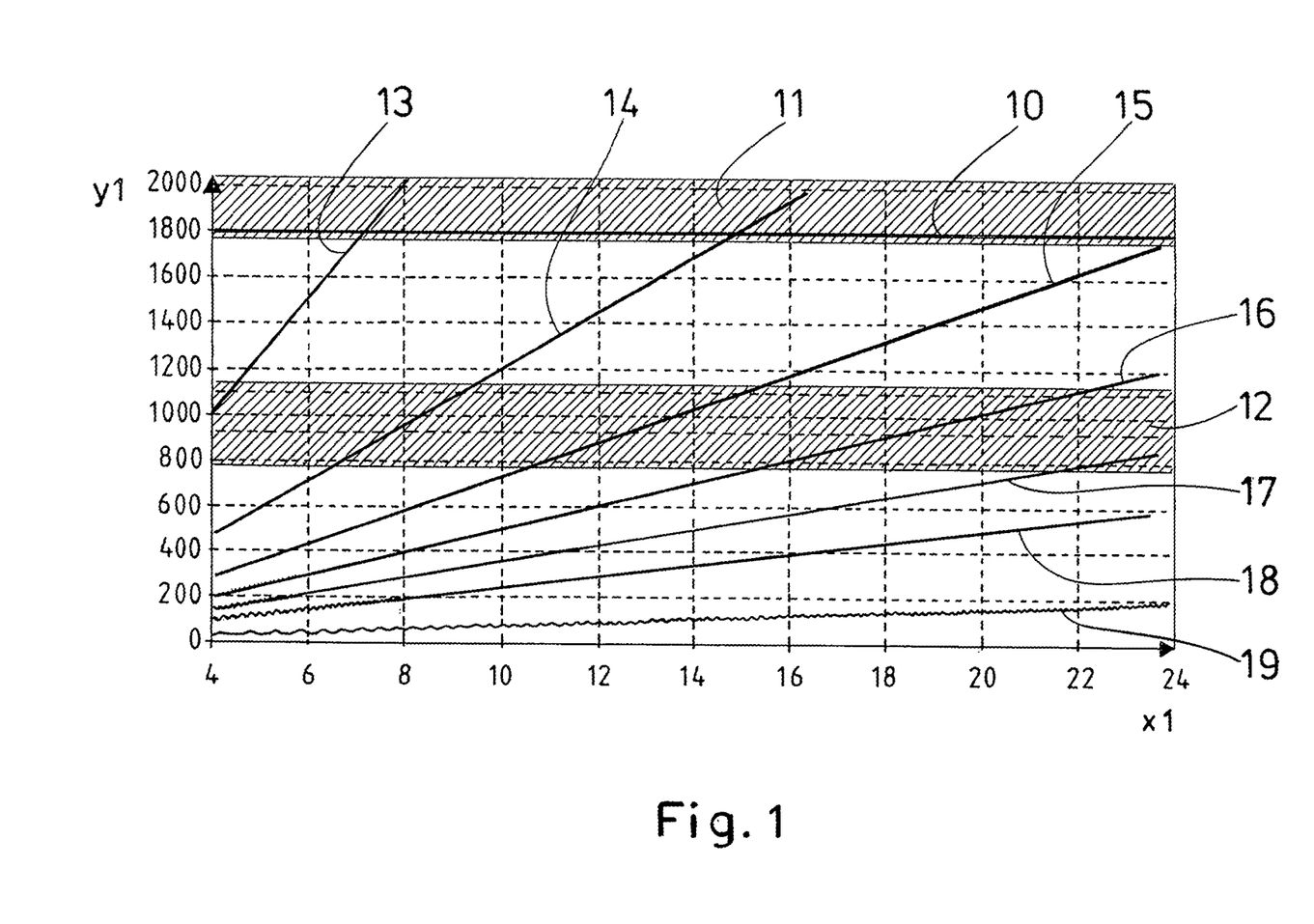
FIG. 1 is a schematic diagram of the generator rotational speed over the wind speed of a wind power plant operated powerless.

FIG. 1 shows a schematic diagram of idling rotational speeds of a wind power plant which is operated with a reduced energy output set point of 0% of the nominal power, or respectively the nominal energy output, of the wind power plant. The generator rotational speed Y1 is plotted in RPM, and the wind speed X1 in m/s. In addition, FIG. 1 shows at 1800 RPM the nominal rotational speed 10 and a prohibited rotational speed range 11 and a prohibited rotational speed range 12. The prohibited rotational speed range 11 is prohibited with a wind power plant operated without power because otherwise dangerous high rotational speeds with high centrifugal forces would arise too quickly. The prohibited rotational speed range 12 lies at the resonance frequencies of the wind power plant. In operation, the rotational speed should be driven quickly through the prohibited rotational speed range 12.

FIG. 1 shows that with different blade angles, or respectively pitch angles, the idling rotational speeds increase substantially linearly from low wind speeds to high wind speeds.

Reference number 13 indicates a progression of the idling rotational speed with a blade angle α of 20°, 14 with a blade angle α of 30°, 15 with a blade angle α of 40°, 16 with a blade angle α of 50°, 17 with a blade angle α of 60°, 18 with a blade angle α of 70° and 19 with a blade angle α of 80°. It can be recognized that the blade angles of 70° or 80° or the blade angles in between would be well-suited in order to infer the wind speed from the generator rotational speed. Thus, with a wind power plant operated powerless, or respectively a wind power plant with a predefinable reduced energy output set point of 0% of the nominal power, the rotor is used as a good indicator for the actual wind speed. Then using this actually detected wind speed, the potential output can be determined using the power characteristic curve of the wind power plant in performance-optimized normal mode. For example the curve 18 of FIG. 1 is the stored characteristic curve for the reduced energy output set point of 0% and the rotational speed of the generator is the predefinable operating parameter of the wind power plant to be measured. This gives the actual wind speed at the location of the wind power plant, from which using the characteristic curve of the wind power plant, which is stored in performance-optimized normal mode, the potential output results with the thusly measured actual wind speed.

Figure 2:
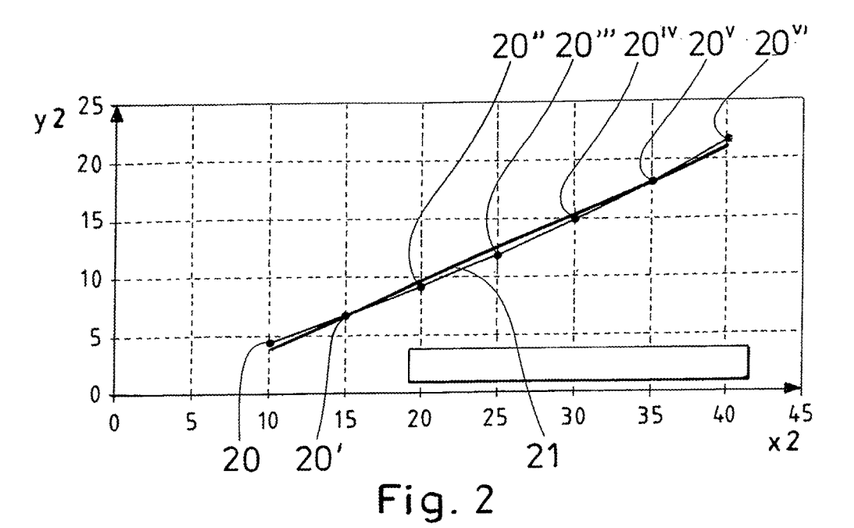
FIG. 2 is a schematic representation of the blade angle over the wind speed with constant generator rotational speed.

FIG. 2 shows a schematic representation of a diagram of the wind speed, or respectively the actual wind speed Y2 in m/s over the blade angle X2 in degrees. Corresponding measured values 20 to 20$^{IV}$ are represented, and a line of best-fit 21 for these measured values, because these lie substantially on a straight line. Another function can also be provided for modifying the measured values in order to provide an interpolation of the measured values that is possibly more exact. This can be a quadratic function, or a function to the third power. Such a curve is drawn in as a thin line in FIG. 2. In this case, the wind power plant is adjusted, or respectively regulated, to a generator rotational speed of for example 1100 RPM. With generator rotational speed adjusted, or respectively regulated to this value, using the blade angle which is necessary in order to set the rotational speed, the wind speed, that is the actual wind speed, can be inferred. With this method, the working range of the rotational speed of the generator can lie both below, as well as above, the critical rotational speed band 12 from FIG. 1.

Figure 4:
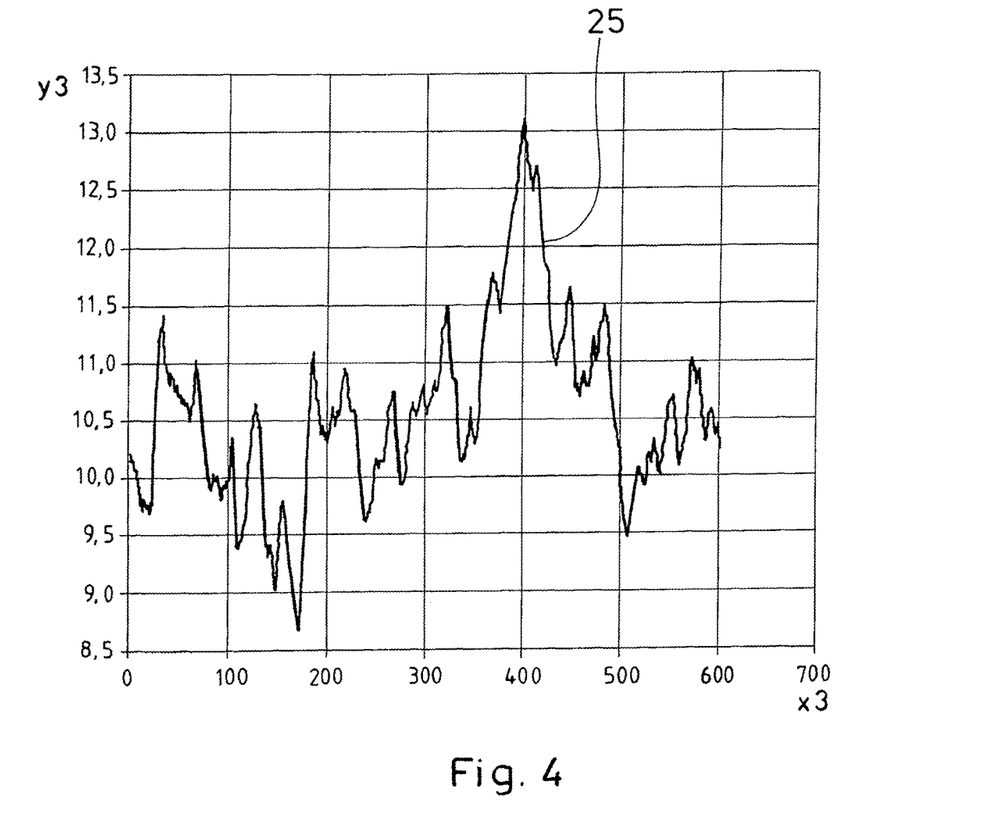
FIG. 4 is a schematic representation of a diagram of the rotor rotational speed over the time with turbulent wind at a wind speed of 15 m/s with a blade angle of approximately 30°.

In order to test whether this method also functions with turbulent wind, a simulation was performed with a wind of 15 m/s, which is set turbulent, wherein the calculation was with a blade angle of approx. 30°. For this, a schematic diagram is shown in FIG. 4 in which the rotor rotational speed Y3 in RPM is shown over the time X3 in seconds. The curve 25 shows the variation of the rotor rotational speed over the time. The nominal rotational speed with the wind power plant, which was used here for simulation, namely the MM82 of the applicant, lies at 17.07 RPM. The standard deviation with the simulation results in 0.8 RPM, and the maximum rotational speed 13.1 RPM. That is, there is no excess rotational speed to be expected with this method, even though the wind power plant is operated also powerless as in the prior example.

In the embodiment according to FIG. 2, again as with FIG. 1, the actual wind speed can also be inferred, which analogous to the example that was described with FIG. 1, leads to a potential output.

In order to provide a more exact value, or respectively the value with less fluctuation, for the potential output, it can be provided for the corresponding measured values to be averaged over a certain time, for example a 10 second average, a 20 second average or a one or five minute average, or a 10 minute or 15 minute average.

Figure 3:
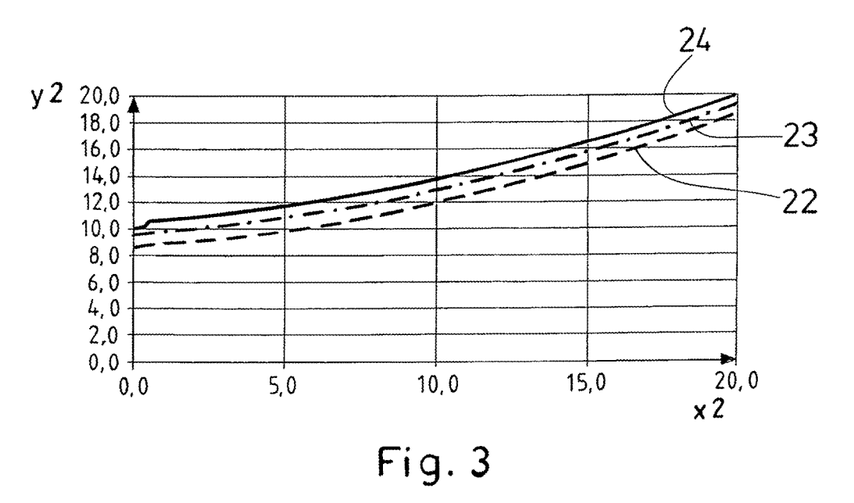
FIG. 3 is a schematic representation of a group of characteristic curves with different predefined energy output set points.

FIG. 3 schematically shows different characteristic curves with corresponding predefined energy output set points, or respectively power set points, and more precisely, a diagram of the wind speed Y2 in m/s over a blade angle X2 in degrees. The characteristic curve 24 is a characteristic curve at nominal power. The characteristic curve 23 is at 80% nominal power, or respectively a predefinable reduced energy output set point of 80% of the nominal energy output, and the characteristic curve 22 is a characteristic curve at 60% nominal power, or respectively a predefinable reduced energy output set point of 60% of the nominal energy output. Here too, as analogous to FIG. 2, the actual wind speed can be determined according to the predefined reduced energy output set point. With energy output set points which lie between these characteristic curves an interpolation can be performed. Preferably, however, a plurality of characteristic curves were measured and stored in advance so that as large a number as possible of characteristic curves are present and can be used for different energy output set points.

Figure 5:
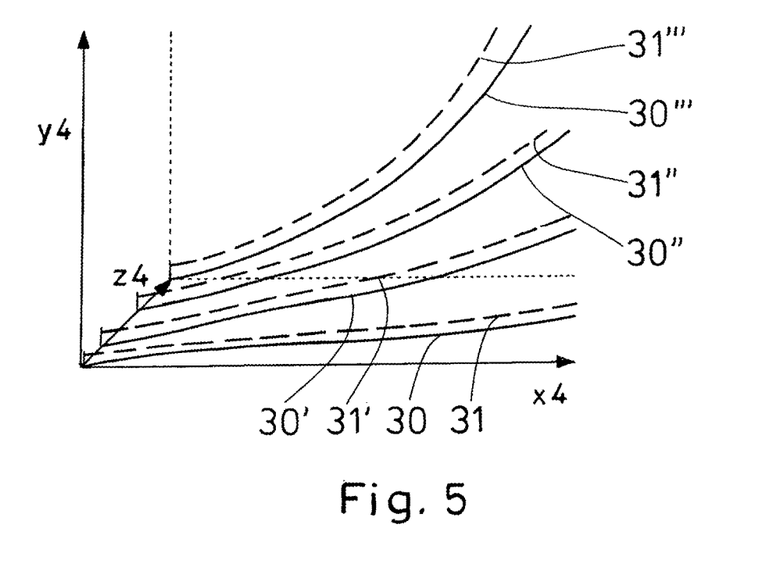
FIG. 5 is a schematic three-dimensional representation of a diagram with corresponding characteristic curves with the coordinates blade angle, potential output, rotational speed.

FIG. 5 shows a schematic three-dimensional diagram with X4 representing the blade angle, Y4 representing the potential output, and Z4 representing the rotational speed. There is also a group of curves in this three-dimensional schematic diagram, namely the group 30, 30', 30", 30''' for characteristic curves for 60% reduced energy output set point and 31, 31', 31" and 31''' for 80% reduced energy output set point. Direct inference can be made about the output potential Y4 using this group of characteristic curves. For example at 60% reduced energy output set point, the blade angle and the rotational speed of the wind power plant are measured, and the potential output Y4 can be determined directly from this. For this purpose preferably still more curves, or characteristic curves, are stored in the wind power plant, or respectively assigned to the wind power plant. If a blade angle and/or a rotational speed are measured that do not lie directly on a stored characteristic curve, here too, an interpolation can be performed between the stored characteristic curves.

Figure 6:
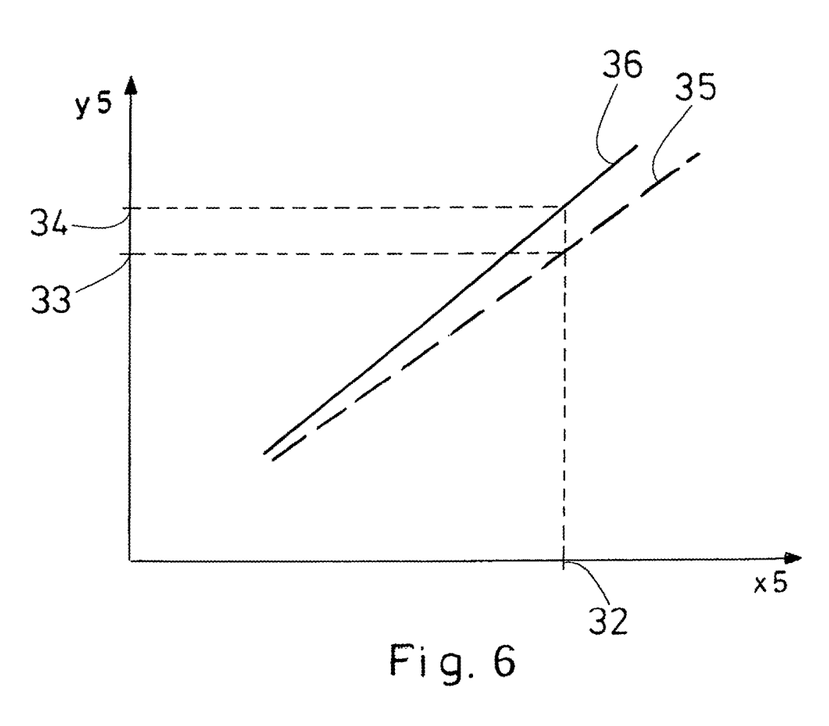
FIG. 6 is a schematic representation of characteristic curves for adapting the measured wind speed to the actual wind speed.

FIG. 6 schematically shows a diagram that can be used for correcting nacelle anemometer wind measurements at different degrees of power reduction, or respectively reduced energy output set points. The actual wind speed Y5 is plotted over the wind speed measured at the nacelle anemometer X5. At a measured value 32 of the wind speed at the nacelle anemometer, using the characteristic curve of, for example, 50% nominal power 35, an actual wind speed 33 can be inferred. Correspondingly at a reduced power, which lies at 80% of the nominal power, or respectively at a reduced energy output set point, which lies at 80% of the nominal energy output, which is represented by the characteristic curve 36, an actual wind speed of 34 is inferred with a measured value of 32. The potential output can be inferred again from this actual wind speed using the power characteristic curve of the wind power plant in the performance-optimized normal mode.

In order to use the entire rotor as an anemometer, characteristic curves of the wind power plant are assigned, or respectively stored, which forms a relationship between the potential output, or respectively the actual wind speed, with a function, or respectively a characteristic curve or a group of characteristic curves, which depend on the blade angle and the rotational speed and possibly special controller settings. Instead of the blade angles, the rotational speed and the potential output, or respectively the power, and also the wind speed, other parameters can be measured that, for example, are already cited above, and otherwise correspond directly, or respectively indirectly, to the power output, the blade angle and the rotational speed.

If the network operator specifies, for example, that only 80% of the nominal power is to be delivered over a certain period of time by a wind farm, or respectively from a wind power plant, the wind power plant can be operated at a lower wind speed thus in partial load mode, initially in performance-optimized normal mode, namely on the characteristic curve in partial load mode. Power reduction measures, or respectively energy output reduction measures must be initiated only upon attaining 80% of the nominal power, or respectively an actual wind speed which would lead to an output of more than 80% of the nominal power. Then, an output potential is determined for a predefined power reduction, or respectively for a predefined reduced energy output set point based on characteristic curve fields, which were measured on a prototype wind power plant or the present wind power plant, and were stored in a data store assigned to the wind power plant. Here, the output power, the blade angle, the rotational speed, the output potential and/or the wind speed are determined using multidimensional interpolation in an assigned characteristic curve field depending on the operating parameters of the wind power plant. For this purpose, preferably a sufficient number of characteristic curves are measured so that the interpolation has a correspondingly high accuracy. The measured characteristic curves are preferably stored in a data store.

Instead of the cited operating parameters naturally also other parameters can be measured which are in unique physical relationship with the parameters power, blade angle, rotational speed, for example centrifugal force instead of the rotational speed, the electrical current or the mechanical torque instead of the power, the aerodynamic angle of attack or the pressure ratio on the blade top surface instead of the blade angle. With the use of the rotor data for determining the potential output, for example the effects such as the changes in air density, the wind gradient across the rotor surface, oblique incident wind flow are already considered, so that this is particularly preferred.

With all preferred embodiments according to the invention, the reduction of the energy output set point, or respectively the power reduction, can occur using a limit relative to the actual power output, or respectively output energy yield. Preferably, the power reduction, or respectively the reduction of the energy output set point occurs however by limiting the nominal power to a predefined value. In addition, alternatively, a power reduction, or respectively a reduction of the energy output set point, can also be defined by a blade angle offset or a rotational speed offset, for example in that the blade angle is moved in the direction to a feathered setting, for example by 3° with respect to the performance-optimized blade angle, or the rotational speed is set to one RPM of the rotor or 10% below the performance-optimized rotational speed. The concept "predefinable reduced energy output set point" also comprises these possibilities of reduction. Thus, preferably a plurality of correction functions, or respectively correction characteristic curves, or respectively characteristic curves, are measured depending on a degree of power reduction, or respectively energy output set point reduction, and in particular depending on percent of power reduction, on percent of energy output set point reduction, on blade angle offset, and/or on rotational speed offset at at least one wind power plant.

For this purpose, the characteristic curves are measured, or respectively determined, at least once before starting the determination of a loss in the output. The characteristic curves can however also be repeated regularly, for example annually, in order to consider changes in the potential output of the wind power plant, for example a deterioration of the degree of efficiency due to aging. For this purpose, again, a calibrated wind speed signal, or respectively energy output signal is necessary, for example using a measurement mast or a calibrated neighboring reference system. A calibrated wind speed signal preferably originates from a measurement mast of a Lidar or respectively Sodar measurement system or measurement systems having a calibrated wind sensor, however, it can also be provided by a calibrated energy output signal or wind speed signal of a neighboring wind power plant, which encounters freely inflowing wind.

Preferably, the losses in output of the wind power plants of a wind farm are compared to each other, and a resurvey of a wind power plant is performed if the losses in output, or respectively the loss of output thereof changes beyond a preset degree in relationship to the losses of output of neighboring wind power plants without detectable cause.

In order to average out brief fluctuations of the wind speed and the wind direction, moving average values are preferably used, for example, with averaging times between 1 minute and 15 minutes, preferably at 10 minutes.

All named characteristics, including those taken from the drawings alone, and individual characteristics, which are disclosed in combination with other characteristics, are considered individually and in combination as essential to the invention. Embodiments according to the invention can be fulfilled through individual characteristics or a combination of several characteristics.

REFERENCE LIST

X1 wind speed
Y1 generator rotational speed
X2 blade angle
Y2 wind speed
X3 time [s]
Y3 rotor rotational speed
X4 blade angle
Y4 potential output
X5 wind speed at the nacelle anemometer
Y5 actual wind speed
Z4 rotational speed
10 nominal rotational speed
11 prohibited rotational speed range
12 prohibited rotational speed range
13 idling rotational speed at $\alpha=20°$
14 idling rotational speed at $\alpha=30°$
15 idling rotational speed at $\alpha=40°$
16 idling rotational speed at $\alpha=50°$
17 idling rotational speed at $\alpha=60°$
18 idling rotational speed at $\alpha=70°$
19 idling rotational speed at $\alpha=80°$
20-20$^{IV}$ measured value
21 line of best-fit 22 characteristic curve at 60% nominal power
23 characteristic curve at 80% nominal power
24 characteristic curve at 100% nominal power
25 curve
30, 30', 30'', 30''' curve for 60% reduced energy output set point
31, 31', 31'', 31''' curve for 80% reduced energy output set point
32 measured value
33 transformed measured value
34 transformed measured value
35 characteristic curve at 50% nominal power
36 characteristic curve at 80% nominal power

The invention claimed is:

1. A method for determining a loss in energy output for a wind power plant having at least one rotor blade with an adjustable blade angle, the method comprising the steps of:
    adjusting one of the adjustable blade angle of the at least one rotor blade or a rotational speed of the at least one rotor blade such that the wind power plant operates at a predefined reduced energy output set point;
    measuring at least two predefined operating parameters of the wind power plant while the wind power plant is operating at the predefined reduced energy output set point;
    applying the measured at least two predefined operating parameters to a first stored characteristic curve to determine a potential energy output for the wind power plant;
    determining an actual energy output for the wind power plant; and
    quantifying the loss in energy output from a difference between the determined potential energy output and the determined actual energy output;
    wherein the at least two predefined operating parameters measured in the measuring step include a rotation-dependent parameter and a blade angle-dependent parameter, and
    wherein the first characteristic curve is related to the at least two predefined operating parameters when the wind power plant is operated at the predefined reduced energy output set point outside of a performance optimized normal mode.

2. The method according to claim 1, further comprising measuring wind speed with a nacelle anemometer of the wind power plant as a wind speed-dependent parameter and applying the measured wind speed-dependent parameter to the first stored characteristic curve when determining the potential energy output.

3. The method according to claim 1, wherein the first stored characteristic curve is determined for the wind power plant using at least one of a reference measurement, a calibrated energy output signal, and a calibrated wind speed signal.

4. The method according to claim 1, wherein a plurality of characteristic curves are stored for use at different predefined reduced energy output set points.

5. The method according to claim 4, wherein when the wind power plant is operated at the predefined reduced energy output set point that is between two of the plurality of characteristic curves, determination of the potential energy output is made based upon interpolation performed between the two of the plurality of characteristic curves.

6. The method according to claim 1, wherein at least one of a rotational speed and a centrifugal force is provided as the rotation-dependent parameter, and at least one of the blade angle and a pressure difference on the rotor blade is provided as the blade angle-dependent parameter.

7. A method for determining total energy output loss for a wind farm having a plurality of wind power plants including at least one wind power plant having at least one rotor blade with an adjustable blade angle, the method comprising:
    determining, according to claim 1, the loss in energy output for the at least one wind power plant having at least one rotor blade with the adjustable blade angle; and
    calculating the total energy output loss for the wind farm based on the loss in energy output determined for the at least one wind power plant having at least one rotor blade with the adjustable blade angle.

8. The method according to claim 7, wherein the at least one wind power plant having at least one rotor blade with the adjustable blade angle is operated powerlessly, and further wind power plants are operated in a performance-optimized normal mode.

9. The method according to claim 8, wherein the wind power plant that is operated powerlessly is set to a predefined blade angle of the at least one rotor blade, and using the first characteristic curve, the potential energy output is determined from the rotational speed of the at least one rotor blade.

10. The method according to claim 8, wherein the wind power plant operated powerlessly is set to a predefined rotational speed and the potential energy output is determined using the first characteristic curve based on the adjustable blade angle of the at least one rotor blade.

* * * * *